United States Patent
Emo et al.

(10) Patent No.: US 7,690,355 B2
(45) Date of Patent: Apr. 6, 2010

(54) FUEL METERING SYSTEM WITH MINIMAL HEAT INPUT

(75) Inventors: Steve M. Emo, South Bend, IN (US); William S. Rowan, South Bend, IN (US); Larry A. Portolese, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 247 days.

(21) Appl. No.: 11/830,452

(22) Filed: Jul. 30, 2007

(65) Prior Publication Data

US 2009/0031990 A1 Feb. 5, 2009

(51) Int. Cl.
*F02M 41/06* (2006.01)
*F02M 41/00* (2006.01)

(52) U.S. Cl. ...................... 123/450; 123/496

(58) Field of Classification Search ............... 123/450, 123/451, 457, 496, 500, 501, 507, 508; 417/492, 417/269, 270, 273, 277; 60/39.28, 39.01, 60/793

See application file for complete search history.

(56) References Cited

U.S. PATENT DOCUMENTS

| | | | | |
|---|---|---|---|---|
| 4,137,013 A | * | 1/1979 | Woodruff | 417/222.1 |
| 5,066,201 A | * | 11/1991 | Nagai et al. | 417/222.1 |
| 5,184,536 A | * | 2/1993 | Arai | 91/505 |
| 5,584,670 A | * | 12/1996 | Kawaguchi et al. | 417/222.2 |
| 5,630,707 A | * | 5/1997 | Kim et al. | 417/269 |
| 6,216,670 B1 | | 4/2001 | Anderson et al. | |
| 6,584,762 B2 | * | 7/2003 | Snow et al. | 60/204 |
| 6,679,077 B2 | * | 1/2004 | Yokomachi et al. | 62/228.3 |
| 6,799,953 B2 | | 10/2004 | Nelson | |
| 6,866,025 B1 | | 3/2005 | Maass | |
| 6,893,228 B2 | | 5/2005 | Nelson | |
| 7,188,608 B2 | | 3/2007 | Wilson et al. | |
| 2003/0074884 A1 | * | 4/2003 | Snow et al. | 60/204 |
| 2006/0222512 A1 | | 10/2006 | Hansen | |
| 2008/0104954 A1 | * | 5/2008 | Schifferer et al. | 60/431 |

OTHER PUBLICATIONS

Rolls-Royce Avon Gas Generator Maintenance, Section 14 . . . Fuel System—Description, Dec. 15, 1972, pp. 7-28.

* cited by examiner

*Primary Examiner*—Mahmoud Gimie
(74) *Attorney, Agent, or Firm*—Ingrassia Fisher & Lorenz, P.C.

(57) ABSTRACT

A fuel metering system for supplying fuel to a plurality of loads includes a variable displacement piston pump having an adjustable hanger that is movable to a plurality of positions. The variable displacement piston pump is configured to receive a drive torque and, upon receipt of the drive torque, to supply fuel to the plurality of loads at a flow rate dependent on the position of the adjustable hanger. A hanger actuator is coupled to receive hanger position commands and is operable, in response thereto, to move the adjustable hanger to the commanded position. A pump control mechanism is coupled to receive the fuel flow commands supplied by the gas turbine engine controller and is operable, in response thereto, to supply the hanger position commands.

9 Claims, 4 Drawing Sheets

FUEL METERING SYSTEM WITH MINIMAL HEAT INPUT

TECHNICAL FIELD

The present invention generally relates to fuel metering systems and, more particularly, to fuel metering systems that supply sufficient fuel flow with minimal heat input to the fuel.

BACKGROUND

Typical gas turbine engine fuel supply systems include a fuel source, such as a fuel tank, and one or more pumps that draw fuel from the fuel tank and deliver pressurized fuel to the fuel manifolds in the engine combustor via a main supply line. The main supply line may include one or more valves in flow series between the pumps and the fuel manifolds. These valves generally include at least a metering valve and a pressurizing-and-shutoff valve downstream of the metering valve. In addition to the main supply line, many fuel supply systems may also include a bypass flow line connected upstream of the metering valve that bypasses a portion of the fuel flowing in the main supply line back to the inlet of the one or more pumps, via a bypass valve. The position of the bypass valve is controlled to maintain a substantially fixed differential pressure across the main metering valve.

Although the above-described fuel supply system configuration is generally safe and reliable, it can suffer certain drawbacks depending on the particular aircraft configuration. For example, these fuel systems can exhibit undesirable levels of fuel heating due to the continuous flow of fuel through the bypass valve and fuel pump. Commonly, the waste heat that is generated in an aircraft is cooled by the engine fuel supply system so that the heat can subsequently be extracted in the gas turbine engine. However, in many systems it is not possible to sink all of the waste heat into the fuel due to maximum temperature limits on the fuel and fuel wetting components. This may result in adding a heat exchanger in the engine fan ducts, which can introduce additional weight and noise, and can also reduce net engine thrust.

Hence, there is a need for a gas turbine engine fuel supply system that does not increase fuel temperature to undesirable levels during operation and/or does not rely on additional heat exchangers. The present invention addresses at least these needs.

BRIEF SUMMARY

In one embodiment, and by way of example only, a fuel metering system for supplying fuel to a plurality of loads includes a gas turbine engine controller, a variable displacement piston pump, a hanger actuator, and a pump control mechanism. The gas turbine engine controller is operable to supply fuel flow commands. The variable displacement piston pump includes an adjustable hanger that is movable to a plurality of positions. The variable displacement piston pump is configured to receive a drive torque and, upon receipt of the drive torque, to supply fuel to the plurality of loads at a flow rate dependent on drive speed and the position of the adjustable hanger. The hanger actuator is coupled to receive hanger position commands and is operable, in response thereto, to move the adjustable hanger to the commanded position. The pump control mechanism is coupled to receive the fuel flow commands supplied by the gas turbine engine controller and is operable, in response thereto, to supply the hanger position commands.

In another exemplary embodiment, a fuel metering system for supplying fuel to a plurality of loads includes a gas turbine engine controller, a variable displacement piston pump, a hanger actuator, a metering valve, a metering valve actuator, and a head sensor. The gas turbine engine controller is operable to supply fuel flow commands. The variable displacement piston pump includes an adjustable hanger that is movable to a plurality of positions. The variable displacement piston pump is configured to receive a drive torque and, upon receipt of the drive torque, to supply fuel to the plurality of loads at a flow rate dependent on drive speed and the position of the adjustable hanger. The metering valve is disposed downstream of the variable displacement piston pump and includes a variable area flow orifice. The metering valve actuator is coupled to receive the fuel flow commands and is operable, in response thereto, to adjust the variable area flow orifice. The head sensor is configured to sense differential pressure across the metering valve and is operable, based on the sensed differential pressure, to supply the hanger position commands.

In yet another exemplary embodiment, a fuel metering system for supplying fuel to a plurality of loads includes a gas turbine engine controller, a variable displacement piston pump, a hanger actuator, and a hanger actuator control device. The gas turbine engine controller is operable to supply fuel flow commands. The variable displacement piston pump includes an adjustable hanger that is movable to a plurality of positions. The variable displacement piston pump is configured to receive a drive torque and, upon receipt of the drive torque, to supply fuel to the plurality of loads at a flow rate dependent on drive speed and the position of the adjustable hanger. The hanger actuator is coupled to receive hanger position commands and is operable, in response thereto, to move the adjustable hanger to the commanded position. The hanger actuator control device is coupled to receive the fuel flow commands supplied by the gas turbine engine controller and is operable, in response thereto, to supply the hanger position commands.

BRIEF DESCRIPTION OF THE DRAWINGS

The present invention will hereinafter be described in conjunction with the following drawing figures, wherein like numerals denote like elements, and wherein.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. In this regard, although an embodiment of the invention is described as being implemented in an aircraft, it will be appreciated that the invention may be implemented in numerous and varied end-use environments where fuel flow to a gas turbine engine is controlled.

Figure 1:
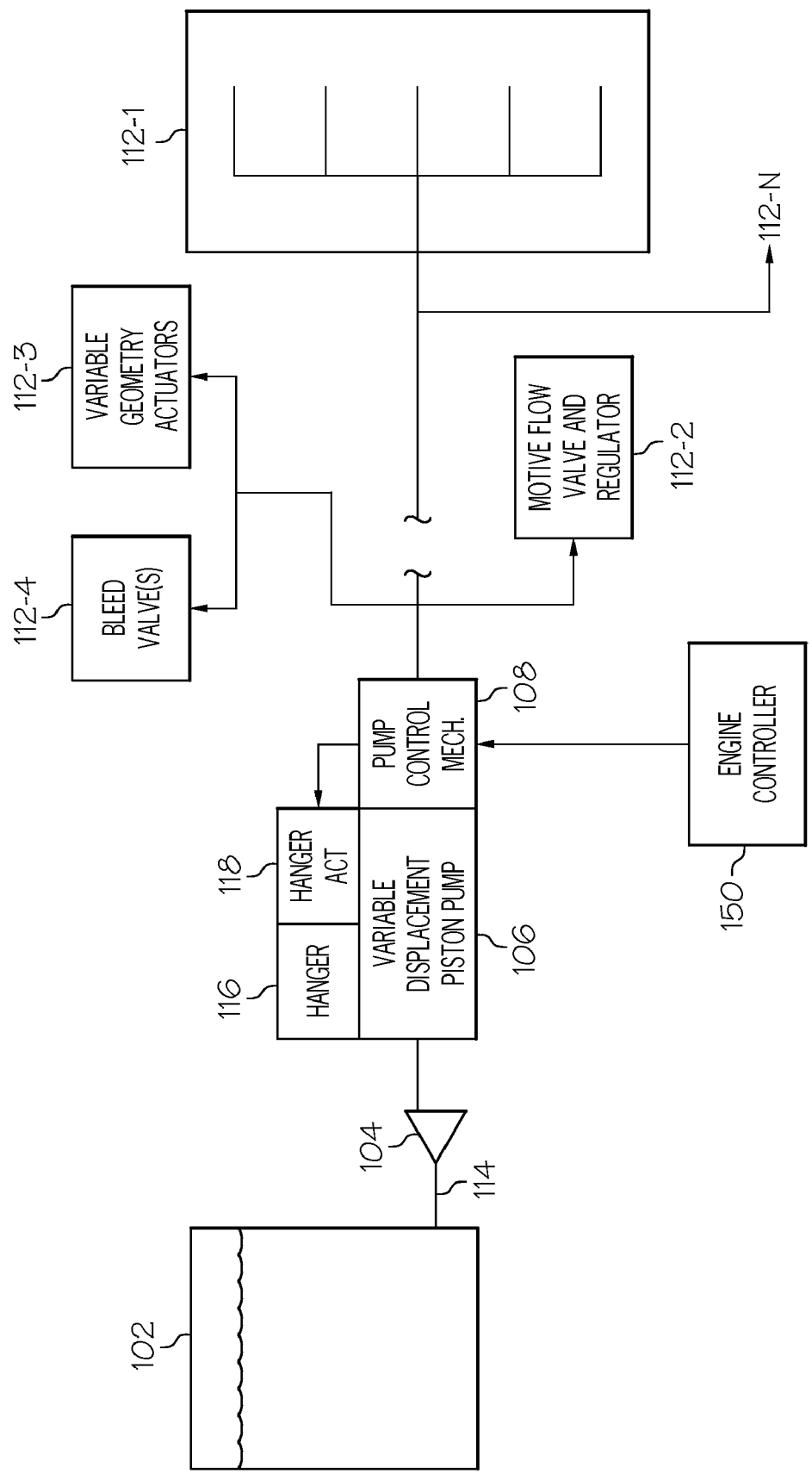
FIG. 1 is a simplified schematic diagram of an exemplary embodiment of a fuel delivery and control system for a gas turbine engine.

Turning now to FIG. 1, a simplified schematic diagram of one embodiment of a fuel delivery and control system for a gas turbine engine, such as a turbofan jet aircraft engine, is depicted. The system 100 includes a fuel source 102, one or more pumps 104, 106, a pump control mechanism 108, and an engine controller 150. The fuel source 102, which is preferably implemented as one or more tanks, stores fuel that is to be supplied to a plurality of fuel loads 112 (e.g. 112-1, 112-2, 112-3, . . . 112-N). It will be appreciated that the number and type of fuel loads may vary, and may include one or more of a gas turbine engine combustor zone and associated nozzles 112-1, a motive flow valve and regulator 112-2, one or more variable geometry actuators 112-3, and one or more bleed valves 112-4, just to name a few.

A supply line 114 is coupled to the fuel source 102 and, via the just-mentioned pumps 104, 106, delivers the fuel to the fuel loads 112. It is noted that the supply line 114 is, for convenience, depicted and described with a single reference numeral. However, it will be appreciated that the system 100 is implemented using separate sections of piping, though a single section is certainly not prohibited. It will additionally be appreciated that a pressurizing and shutoff valve, although not depicted or described herein, may be disposed in the supply line 114 downstream of the pumps 104, 106. The pressurizing-and-shutoff valve, if included, functions to ensure there is a minimum system pressure magnitude in portions of the supply line 114, and shuts when the pressure falls below this minimum pressure magnitude.

Each of the one or more pumps 104, 106 is positioned in flow-series in the supply line 114 and take a suction on the fuel source 102. In the depicted embodiment, two engine-driven pumps are used and include a boost pump 104, such as a relatively low horsepower centrifugal pump, and a high pressure pump 106, such as a variable displacement piston pump. The boost pump 104 takes a suction directly on the fuel source 102 and provides sufficient suction head for the high pressure pump 106. The high pressure pump 106, a preferred embodiment of which will now be described, then supplies the fuel at a relatively high pressure to the remainder of the supply line 114. Although not depicted, it will be appreciated that the system 100 may additionally include a low pressure pump with the fuel tank(s) 102 to supply fuel to the boost pump 104.

The high pressure pump 106, as noted above, is preferably a variable displacement piston pump, and includes an adjustable hanger 116, and a hanger actuator 118. As is generally known, a variable displacement piston pump can be adjusted to increase or decrease the amount of fuel it supplies. More specifically, the adjustable hanger 116, or swash plate as it is sometimes referred to, is coupled to a plurality of non-illustrated pistons that are disposed, one each, in a plurality of non-illustrated cylinders. The stroke of the pistons in the cylinders, and thus the flow rate of the variable displacement piston pump 106, is varied by varying the position of the adjustable hanger 116. The position of the adjustable hanger 116 is varied by the hanger actuator 118, which is responsive to hanger position commands supplied from the pump control mechanism 108. In a particular preferred embodiment, the variable displacement piston pump 106 is a floating port plate type of pump, as this pump type may readily exhibit the desired frequency response of at least 20 Hz.

The pump control mechanism 108 is coupled to receive fuel flow commands supplied from the engine controller 150. The pump control mechanism 108, in response to the fuel flow commands received from the engine controller 150, supplies the hanger position commands to the hanger actuator 118. The pump control mechanism 108 may be variously configured to implement this functionality. One particular configuration, which is depicted more clearly in FIG. 2, will now be described. Another particular configuration, which is depicted in FIG. 3, will subsequently be described further below.

Figure 2:
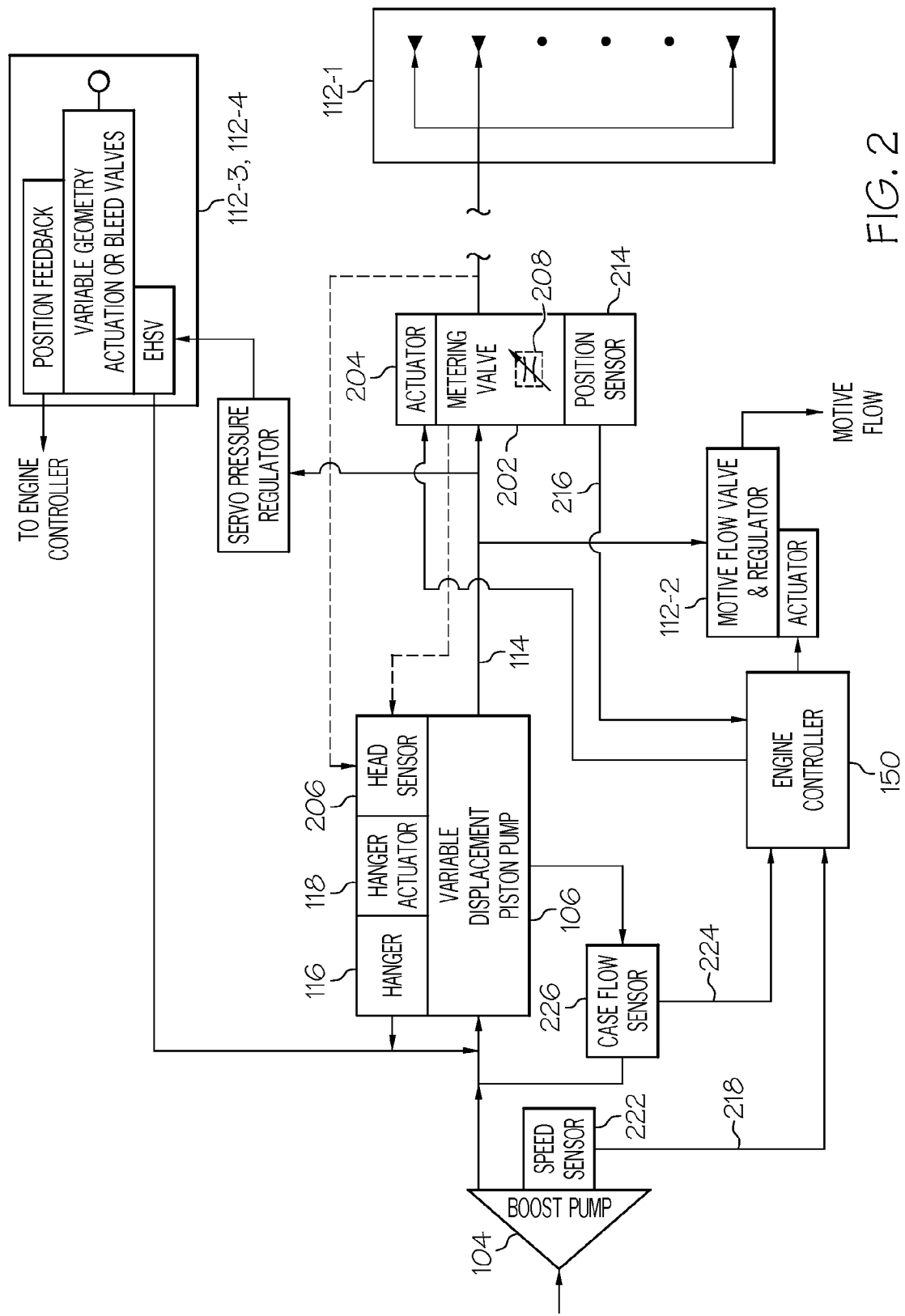
FIG. 2 is a functional block diagram of a portion of the fuel delivery and control system of FIG. 1 that depicts an embodiment of a pump control mechanism in more detail.
Figure 3:
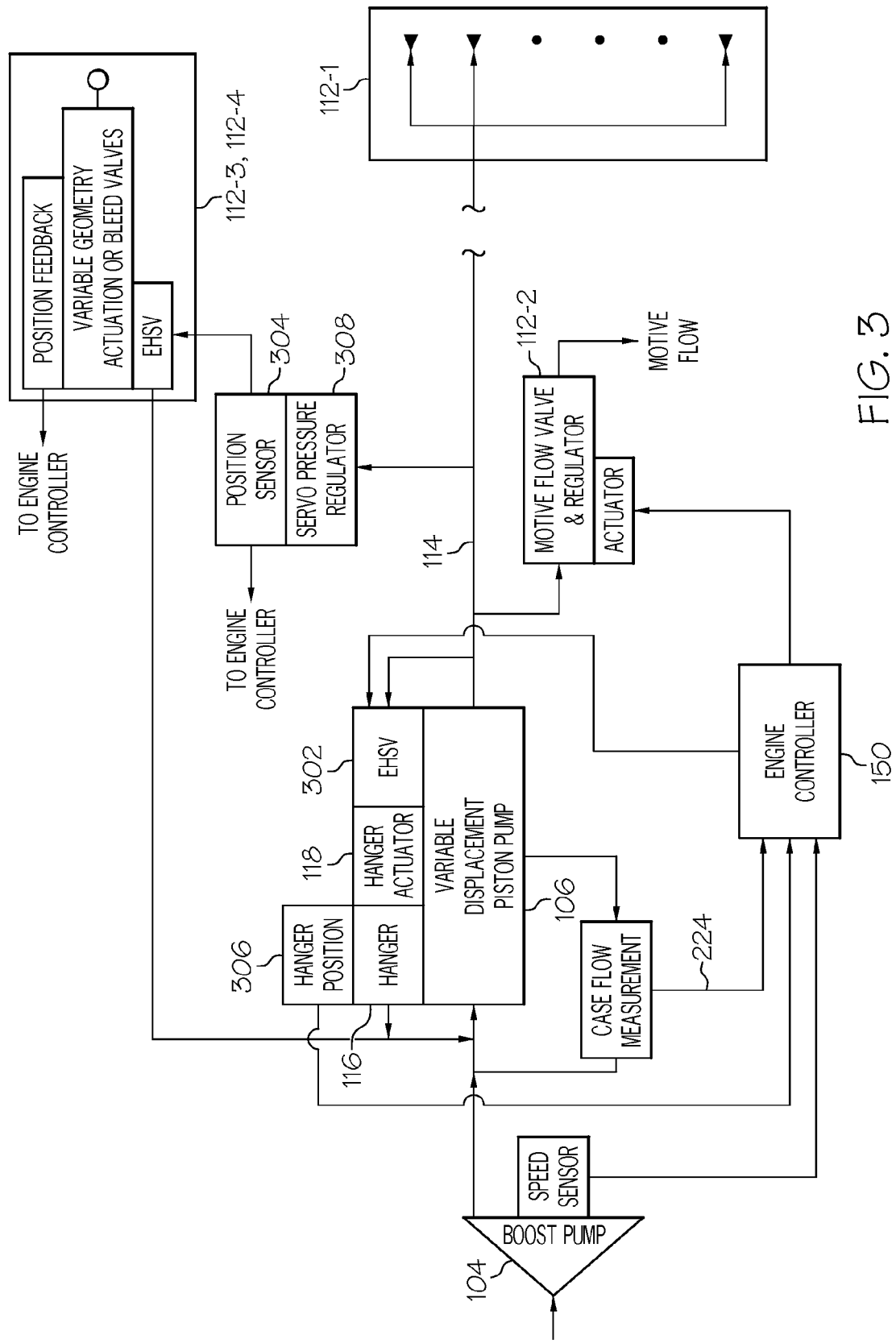
FIG. 3 is a functional block diagram of a portion of the fuel delivery and control system of FIG. 1 that depicts another embodiment of a pump control mechanism in more detail.

Turning now to FIG. 2 it is seen that the depicted pump control mechanism 108 includes a metering valve 202, a metering valve actuator 204, and a head sensor 206. The metering valve 202 is positioned in flow-series in the supply line 114 downstream of the variable displacement piston pump 106 and upstream of the combustor 112-1. The metering valve 202 includes a variable area flow orifice 208 through which a portion of the fuel in the supply line 114 flows. The metering valve actuator 204 is used to adjust the position of the metering valve 202, and thus the area of the variable area flow orifice 208. In the depicted embodiment, the metering valve 202 is a hydraulically-operated valve and the metering valve actuator 204 is an electro-hydraulic servo valve (EHSV) that is used to adjust the position of the metering valve 202 by controlling the flow of operational hydraulic fluid to the metering valve 202.

It will be appreciated that the metering valve 202 and the metering valve actuator 204 described above are only exemplary of a particular embodiment, and that each may be implemented using other types of devices. For example, the metering valve 202 could be an electrically operated valve. In this case, the metering valve actuator 204, may not be used, or it could be implemented as an independent controller. In any case, as will be described further below, fuel flow rate to the engine combustor is controlled by adjusting the position of the metering valve 202, and thus the area of the variable area flow orifice 208, via the metering valve actuator 204.

As FIG. 2 also depicts, a position sensor 214 is coupled to the metering valve 202. The position sensor 214 is configured to sense metering valve position and supply a metering valve position signal 216 to the engine controller 150. The position of the metering valve 202 is directly related to the area of the variable area flow orifice 208, which is directly related to the fuel flow rate to the combustor 112-1. The position sensor 214 is preferably a dual channel linear variable differential transformer (LVDT), but could be any one of numerous position sensing devices known in the art. For example, the position sensor 214 could be a rotary variable differential transformer (RVDT), an optical sensor, a potentiometer sensor, or the like.

The head sensor 206 is configured to sense the differential pressure ($\Delta P$) between the inlet and outlet of the metering valve 202. The head sensor 206, which is coupled to the hanger actuator 118, supplies hanger position commands to the hanger actuator 118 based on the sensed $\Delta P$. In particular, the head sensor 206 supplies the hanger position commands to the hanger actuator 118 to control the position of the adjustable hanger 116 such that the flow rate supplied by the variable displacement pump maintains a substantially constant, predetermined $\Delta P$ across the metering valve 202. It will be appreciated that the head sensor 202 may be implemented using any one of numerous types of sensors known in the art. Some non-limiting examples include a thermally-compensated, spring-loaded, diaphragm-type sensor, a spring-loaded, bellows compensated, nozzle flapper, a spring biased spool valve, or the like.

The engine controller 150, which may be implemented as a Full Authority Digital Engine Controller (FADEC) or other electronic engine controller (EEC), controls the flow of fuel to the combustor 104. To do so, the engine controller 150 receives various input signals and controls the fuel flow rate to the combustor 112-1 accordingly. In particular, the engine controller 150 receives an input from, for example, thrust command equipment (not illustrated) in a non-illustrated aircraft cockpit, the metering valve position signal 216, and a speed signal 218 representative of variable displacement piston pump speed from a pump sensor 222. In the embodiment depicted in FIG. 3, the engine controller 150 may additionally receive a flow signal 224 representative of internal case flow in the variable displacement piston pump 106 from a case flow sensor 226, if so desired for health monitoring purposes. Although the pump speed sensor 222 is depicted in FIG. 2 as being configured to send boost pump speed, it will be appreciated that boost pump speed is also representative of variable displacement piston pump speed. It will additionally be appreciated that the speed sensor 222 could alternatively be coupled to sense variable displacement piston pump speed directly. As FIG. 2 further depicts, the engine controller 150 is further configured to supply appropriate control signals to one or more control devices associated with one or more of the other fuel loads 112-2, 112-3, 112-4, . . . 112-N and, when needed or desired, to receive one or more feedback position signals from one or more of these additional fuel loads. These other control signals control the fuel flow, in a continuous manner or in a binary manner, as the case may be, to these additional loads.

In any case, the engine controller 150, in response to signals is receives, supplies the fuel flow commands to the metering valve actuator 204. In response to the fuel flow commands, the metering valve actuator 204, as was described above, adjusts the area of the metering valve variable area flow orifice 208 to obtain the desired flow rate to the combustor 112-1. Specifically, the fuel flow rate ($W_F$) to the combustor 112-1 is controlled in accordance with the following flow equation (Equation 1):

$$W_F = K_1 \times A_{MV} \times \sqrt{\Delta P},$$

where $K_1$ is a flow constant that is a function of fuel density, fuel temperature, and metering valve discharge coefficient (CD), $A_{MV}$ is the area of the variable area flow orifice 208, which is a known function of metering valve position, and $\Delta P$ is the differential pressure across the metering valve 202. The position of the adjustable hanger 116 is controlled so that the flow rate delivered by the variable displacement piston pump 106 maintains a constant $\Delta P$ across the metering valve 202. Thus, since $K_1$ is a constant, the flow rate, $W_F$, is controlled by adjusting the area, A, of the metering valve variable area flow orifice 208.

With the configuration depicted in FIG. 2 and described above, the variable displacement piston pump 106 preferably exhibits a frequency response that is about four to five times that of a conventional bypass/head regulator system used in a conventional fuel supply system. Thus, the variable displacement piston pump 106 and its regulation of the metering valve differential pressure allow it to deliver only the flow that is needed. Furthermore, the frequency response or load on the variable displacement piston pump 106 from the ancillary fuel loads 112-2, 112-3, 112-4, . . . 112-N is relatively low. Thus, the variable displacement piston pump 106 can supply only the flow that is needed by the system 100 at the minimum pressure required by the system 100. Because there is no excess pump flow, and only the minimum pressure that is needed is supplied, this system configuration exhibits relatively high thermal efficiency. This requires the minimal power to drive, thus improving the engine system's overall specific fuel consumption. Moreover, this configuration may be implemented in a manner that is transparent to the engine controller 150 of a conventional system.

With reference now to FIG. 3, the other particular pump control mechanism configuration that was mentioned above will be described. Before doing so, however, it is noted that many of the system components described above in connection with the embodiment depicted in FIG. 2 are also depicted in FIG. 3. For the sake of brevity, these like components are depicted using like reference numerals and, unless needed to fully describe this particular embodiment, will not be further described.

With the above background in mind, it is seen that the pump control mechanism 108 in FIG. 3 includes a hanger actuator control device 302. Moreover, with this pump control mechanism 108, no metering valve 202 or other flow control valve is used to regulate fuel flow to the combustor 112-1, or any of the other fuel loads 112-2, 112-3, 112-4, . . . 112-N for that matter. Rather, fuel flow to the fuel loads 112 is regulated by direct control of adjustable hanger position by the engine controller 150. More specifically, rather than supply fuel flow commands to the metering valve actuator 204, the engine controller 150 supplies the fuel flow commands to the hanger actuator control device 302. The hanger actuator control device 302, in response to the fuel flow commands, supplies the hanger position commands to the hanger actuator 118 to control the position of the hanger 116 such that the variable displacement pump supplies the commanded fuel flow rate.

Before proceeding further it is noted that, at least in the depicted embodiment, the hanger actuator 118 is a hydraulically-operated device and the hanger actuator control device 302 is an electro-hydraulic servo valve (EHSV) that is used to adjust the position of the hanger actuator 118 by controlling the flow of operational hydraulic fluid to the hanger actuator 118. It will be appreciated that this only exemplary of a particular embodiment, and that each may be implemented using other types of devices. For example, the hanger actuator 118 could be an electrically operated actuator. In this case, the hanger actuator control device 302, may not be used, or it could be implemented as an independent controller.

With the configuration depicted in FIG. 3, the engine controller 150 is preferably supplied with information representative of total system flow demands, and hanger position response to variations in flow demands. As such, it is seen that with this configuration, the system 100 also preferably includes a servo pressure regulator position sensor 304 and a hanger position sensor 306. The servo pressure regulator position sensor 304 is configured to sense the position of a servo pressure regulator 308 that regulates the pressure of fuel supplied to, for example, variable geometry actuators 112-3. The servo pressure regulator position sensor 304 supplies a position signal representative of the sensed position, and thus the flow used by the servo pressure regulator and downstream loads, to the engine controller 150. The servo pressure regulator position sensor 214 is preferably a linear variable differential transformer (LVDT), but could be any one of numerous position sensing devices known in the art such as, for example, a rotary variable differential transformer (RVDT), an optical sensor, a potentiometer sensor, or the like. The hanger position sensor 306 is configured to sense the position of the adjustable hanger 118 and supply a position signal representative thereof to the engine controller 150. The hanger position sensor 306 may additionally be any one of numerous position sensing devices known in the art.

Figure 4:
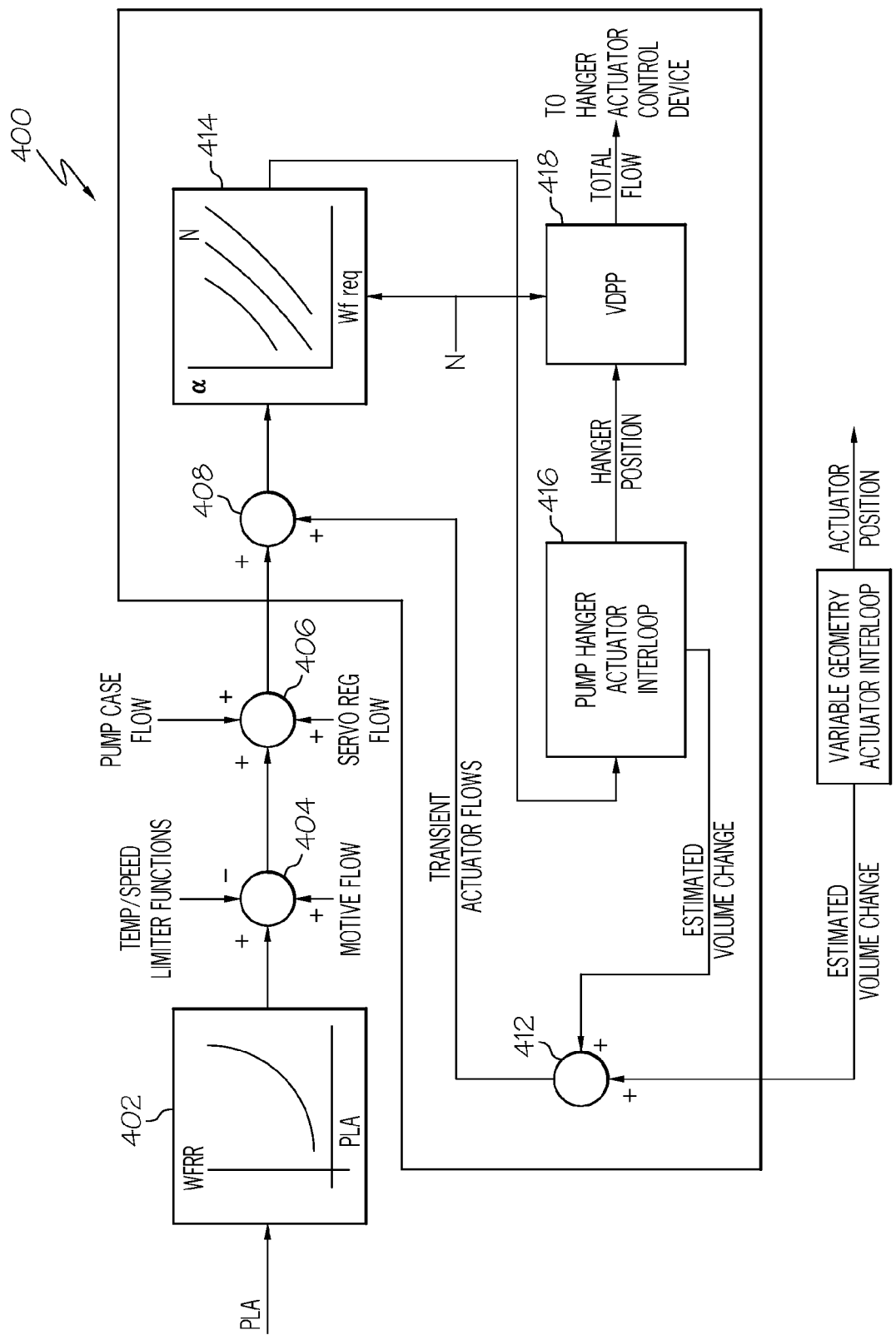
FIG. 4 is a functional block diagram of a control scheme that may be implemented by an engine controller to control fuel flow in the embodiment depicted in FIG. 3.

The system 100 depicted in FIG. 3 is preferably configured to respond to relatively rapidly to fuel flow demand changes to prevent perturbations in the fuel flow to the combustor 112-1. A particular embodiment of a control scheme 400 that may be implemented in the engine controller 150 is depicted in FIG. 4, and with reference thereto will now be described. The control scheme 400 includes a schedule of combustor flow versus power lever angle (PLA) 402. The PLA, as is generally known, is representative of the position of the above-mentioned thrust control equipment, such as a power lever, in the non-illustrated cockpit. The schedule 402 is, as it readily depicts, a schedule of the combustor fuel flow that is needed for the gas turbine engine to generate the power associated with the position of the power lever.

The schedule 402 supplies a signal representative of appropriate fuel flow value to a first summer 404. The first summer 404 adds a signal representative of the required motive flow to the combustor flow, and subtracts one or more signals representative of fuel temperature and engine speed limits to the combustor flow. Signals representative of the servo regulator flow and the pump case flow, which are supplied (or derived) from the servo pressure regulator position sensor 304 and the case flow sensor 226, respectively, are supplied to a second summer 406 and are added to the output of the first summer 404. The output of the second summer 406 is supplied to a third summer 408, which also receives a signal representative of transient actuator flows from a fourth summer 412. The output of the third summer 408, which is representative of the total required flow needed by all of the fuel loads 112, is supplied to another schedule 414, which will be described momentarily. Before doing so, it is seen that the signal representative of transient actuator flows is the summation of flow changes that result from variations in the positions of the hanger actuator 118 and the variable geometry actuators 112-3.

The other schedule 414 included in the depicted control scheme 400 is a schedule of hanger position (α) versus total required flow. As FIG. 4 depicts, this schedule is actually a family of schedules of hanger position (α) versus total required flow (Wf req) for various engine speeds (N). Thus, a signal representative of engine speed (N), which is directly related to variable displacement piston pump speed, is also supplied to the schedule 414. The output of the schedule 414, which is representative of a desired hanger position to achieve the required flow, is supplied to a model 416 of the hanger actuator 118. This model 416 supplies a signal representative of hanger position to a model 418 of the variable displacement piston pump 106. This model 418, which also receives the signal representative of engine speed (N), supplies the fuel flow command, which is representative of the total required system flow, to the hanger actuator control device 302.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fuel metering system for supplying fuel to a plurality of loads, comprising:
   a gas turbine engine controller operable to supply fuel flow commands;
   a variable displacement piston pump including an adjustable hanger that is movable to a plurality of positions, the variable displacement piston pump configured to receive a drive torque and, upon receipt of the drive torque, to supply fuel to the plurality of loads at a flow rate dependent on drive speed and the position of the adjustable hanger;
   a hanger actuator coupled to receive hanger position commands and operable, in response thereto, to move the adjustable hanger to the commanded position;
   a metering valve disposed between the variable displacement piston pump and at least one of the plurality of loads, the metering valve including a variable area flow orifice;
   a metering valve actuator coupled to receive the fuel flow commands and operable, in response thereto, to adjust the variable area flow orifice; and
   a head sensor configured to sense differential pressure across the metering valve and operable, based on the sensed differential pressure, to supply the hanger position commands.

2. The system of claim 1, wherein:
   the hanger position is adjusted to maintain a substantially constant differential pressure across the variable area flow orifice.

3. The system of claim 1, wherein the metering valve actuator comprises an electro-hydraulic servo valve.

4. The system of claim 1, further comprising:
   a position sensor coupled to the metering valve and configured to sense metering valve position and supply a metering valve position signal to the gas turbine engine controller.

5. The system of claim 1, further comprising:
   a boost pump disposed upstream of, and operable to supply a flow of fuel to, the variable displacement piston pump; and
   a pump speed sensor operable to sense variable displacement piston pump speed and to supply a speed signal representative thereof to the gas turbine engine controller.

6. The system of claim 1, further comprising:
   a case flow sensor operable to sense pump case flow in the variable displacement piston pump and to supply a case flow signal representative thereof to the gas turbine engine controller.

7. A fuel metering system for supplying fuel to a plurality of loads, comprising:
   a variable displacement piston pump including an adjustable hanger that is movable to a plurality of positions, the variable displacement piston pump configured to receive a drive torque and, upon receipt of the drive torque, to supply fuel to the plurality of loads at a flow rate dependent on drive speed and the position of the adjustable hanger;
   a hanger actuator coupled to receive hanger position commands and operable, in response thereto, to move the adjustable hanger to the commanded position;
   a hanger position sensor configured to sense the position of the adjustable hanger and to supply a position signal representative thereof;

a case flow sensor operable to sense pump case flow in the variable displacement piston pump and to supply a case flow signal representative thereof;

a gas turbine engine controller coupled to receive the position signal and the case flow signal and responsive, at least in part, to the position signal and the case flow signal to supply fuel flow commands; and a hanger actuator control device coupled to receive the fuel flow commands supplied by the gas turbine engine controller and operable, in response thereto, to supply the hanger position commands.

8. The system of claim 7, wherein the hanger actuator control device comprises an electro-hydraulic servo valve.

9. The system of claim 7, further comprising:

a boost pump disposed upstream of, and operable to supply a flow of fuel to, the variable displacement piston pump; and a pump speed sensor operable to sense variable displacement piston pump speed and to supply a speed signal representative thereof to the gas turbine engine controller;

a case flow sensor operable to sense pump case flow in the variable displacement piston pump and to supply a case flow signal representative thereof to the gas turbine engine controller.

* * * * *